United States Patent
Tang et al.

[11] Patent Number: 5,565,251
[45] Date of Patent: Oct. 15, 1996

[54] STABILIZER BAR BUSHING WITH ULTRA HIGH MOLECULAR WEIGHT POLYETHYLENE LINING METHOD OF MANUFACTURE

[75] Inventors: Solomon H. Tang, Carmel; Richard D. Hein; James A. Roth, both of Wabash, all of Ind.

[73] Assignee: BTR Antivibration Systems, Inc.

[21] Appl. No.: 327,529

[22] Filed: Oct. 21, 1994

[51] Int. Cl.⁶ ................................................. B32B 25/08
[52] U.S. Cl. .......................... 428/36.8; 403/220; 403/228; 267/141.2; 428/908.8
[58] Field of Search ................................... 403/220, 221, 403/228; 280/689; 267/141, 141.2, 141.4, 141.5, 153; 248/634; 384/220.2, 909; 428/35.7, 36.8, 36.9, 36.91, 131, 134, 136, 137, 334, 908.8, 494, 517, 335, 336

[56] References Cited

U.S. PATENT DOCUMENTS

| | | | |
|---|---|---|---|
| 3,030,132 | 4/1962 | Compton | 287/85 |
| 3,070,392 | 12/1962 | Potter | 287/119 |
| 3,501,184 | 3/1970 | Van Winsen et al. | 287/88 |
| 3,650,874 | 3/1972 | Pneumatiques | 161/217 |
| 3,801,209 | 4/1974 | Matsuoka | 403/225 |
| 4,083,580 | 4/1978 | Shaner | 280/689 |
| 4,316,643 | 2/1982 | Burk et al. | 308/26 |
| 4,636,106 | 1/1987 | Waisbrod | 403/228 |
| 4,854,766 | 8/1989 | Hein | 403/224 |
| 4,913,976 | 4/1990 | Brooks et al. | 428/494 |
| 4,923,759 | 5/1990 | Brooks et al. | 428/521 |
| 4,951,962 | 8/1990 | Tomida et al. | 280/689 |
| 5,013,379 | 5/1991 | Brooks et al. | 156/244.11 |
| 5,064,216 | 11/1991 | Hynds | 280/689 |
| 5,110,685 | 5/1992 | Cross et al. | 428/494 |
| 5,118,070 | 6/1992 | Reid | 248/635 |
| 5,190,269 | 3/1993 | Ikeda et al. | 267/140 |
| 5,224,790 | 7/1993 | Hein | 403/225 |
| 5,288,152 | 2/1994 | Davies | 384/220 |

FOREIGN PATENT DOCUMENTS

| | | | |
|---|---|---|---|
| 4025629 | 1/1992 | Japan | 267/153 |
| 4316730 | 11/1992 | Japan | 267/153 |
| 6129463 | 5/1994 | Japan | 267/141.2 |
| 1141029 | 1/1969 | United Kingdom . | |
| 1423541 | 2/1976 | United Kingdom . | |

OTHER PUBLICATIONS

Soluflex, The Ultimate Elastomer Line (DSM).

Primary Examiner—Ellis Robinson
Assistant Examiner—C. Kyriakou
Attorney, Agent, or Firm—Brinks Hofer Gilson & Lione

[57] ABSTRACT

A stabilizer bar bushing adapted to receive a metal stabilizer bar and to be secured within a mounting assembly that is attached to a vehicle frame for cooperatively resisting excessive sway when a vehicle is turning and a method of manufacture. The stabilizer bar bushing includes an elastomeric member and a low coefficient of friction film layer. The elastomeric member has an outer diameter, an inner diameter defining a bore and a slot extending the longitudinal length of the elastomeric member from the outer diameter to the inner diameter. The low coefficient of friction film layer is adhered to the inner diameter and the slot to facilitate ease of insertion of the stabilizer bar within the bore and reduce frictional engagement of the elastomeric member with the stabilizer bar.

9 Claims, 6 Drawing Sheets

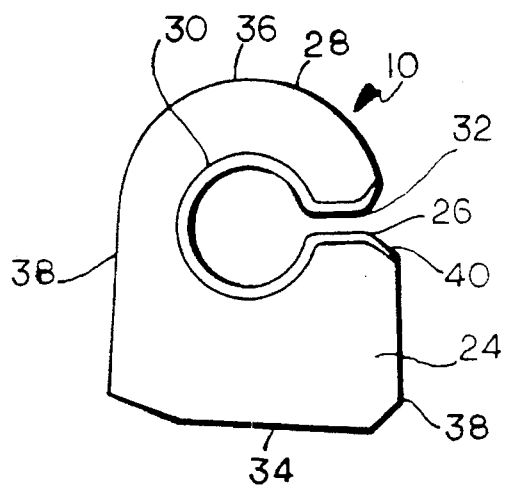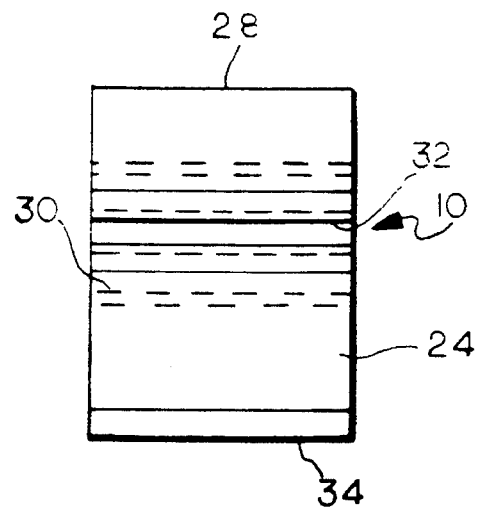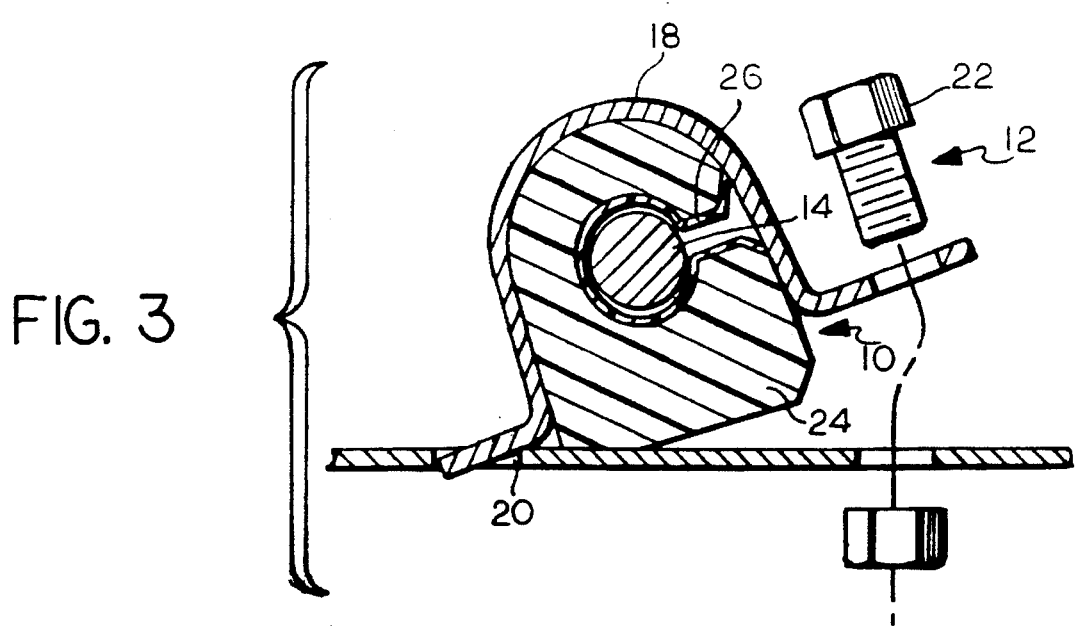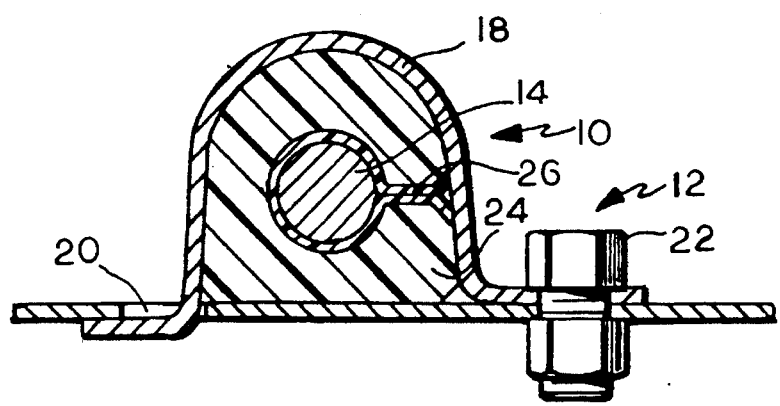

5,565,251

STABILIZER BAR BUSHING WITH ULTRA HIGH MOLECULAR WEIGHT POLYETHYLENE LINING METHOD OF MANUFACTURE

FIELD OF THE INVENTION

This invention relates to a stabilizer bar bushing and method of manufacture. More particularly, this invention relates to a stabilizer bar bushing having a low coefficient of friction film layer adhered thereto to facilitate ease of insertion of a stabilizer bar within the bushing and reduce frictional engagement between the bushing and the stabilizer bar and a method of manufacture.

BACKGROUND OF THE INVENTION

Motor vehicles use a stabilizer bar installed across the frame of the vehicle between the lower control arms of the vehicle's suspension system to control vehicle sway during turns. When a vehicle travels around a curve, the centrifugal force tends to keep the vehicle body moving in a straight line, causing the vehicle to lean outward, i.e., away from the direction of the turn, putting additional compressive force on the outer coil spring and causing the outer control arm to move upward, which carries one end of the stabilizer bar upward. The inner coil spring is placed in tension during the turn as there is less weight on the inner control arm, which lowers the control arm and carries the opposite end of the stabilizer bar downward. Thus, when turning a vehicle, the outer end of the stabilizer bar is carried upward and the inner end is carried downward, causing a rotational or twisting movement of the stabilizer bar. Therefore, the stabilizer bar must be mounted to the frame using a mounting system which allows the stabilizer bar to rotate.

Prior art systems mount the stabilizer bar on the vehicle frame with a U-shaped bracket securing a rubber or rubber like support having a bore equal in size to the outer diameter of the stabilizer bar. Typically, the stabilizer bar is made of steel bar stock having a generally smooth exterior.

When the stabilizer bar rotates within the rubber support member, i.e., during a turn, a squeak or other audible noise is produced as a result of the friction occurring between the stabilizer bar and the rubber support. It is believed that the stabilizer bar bushing squeaks due to the high frictional coefficient of rubber, especially at low temperatures (below 0 degrees C.). While this noise does not affect the performance of the vehicle, it is irritating to the vehicle owner and results in consumer complaints and increased warranty costs.

Moreover, because the rubber bushing is providing access of the bar through a very narrow slit installation is more difficult than the "snap on" feature of the present invention.

For a detailed discussion of the operation of a stabilizer bar and stabilizer bar bushing reference is made to U.S. Pat. No. 5,118,070, incorporated herein by reference.

In view of the foregoing, there is a need for a stabilizer bar bushing which has a low friction, highly abrasion resistant material adhered thereto to reduce and/or eliminate the problem of unwanted noise and facilitate insertion of the stabilizer bar within the bushing.

It is an object of the present invention to provide a stabilizer bar bushing which has a low friction, highly abrasion resistant material adhered thereto to reduce and/or eliminate the problem of unwanted noise and facilitate insertion of the stabilizer bar within the bushing. Another object of the present invention is to provide a process such that the rubber does not bleed and contact the stabilizer bar. Yet another object of the invention is to provide a stabilizer bar bushing and method of manufacture that is simple and economical.

SUMMARY OF THE INVENTION

Briefly, according to this invention there is provided a stabilizer bar bushing adapted to receive a metal stabilizer bar and to be secured within a mounting assembly that is attached to a vehicle frame for cooperatively resisting excessive sway when a vehicle is turning. The stabilizer bar bushing includes an elastomeric member and a low coefficient of friction film layer. The elastomeric member has an outer diameter, an inner diameter defining a bore and a slot extending the longitudinal length of the elastomeric member from the outer diameter to the inner diameter. The low coefficient of friction film layer is adhered to the inner diameter and the slot to facilitate ease of insertion of the stabilizer bar within the bore and reduce frictional engagement of the elastomeric member with the stabilizer bar.

The stabilizer bar bushing may be produced by providing a die assembly including a die having a cavity of a shape of an outer profile of the stabilizer bar bushing, and a film guide having an outer profile of the shape of the bore of the stabilizer bar bushing; positioning the film guide within the die; guiding a low coefficient of friction film through the film guide and through the die; and extruding and funneling an elastomeric material toward the center of the die assembly and around the film guide to form a stabilizer bar bushing including a bore having a layer of a low coefficient of friction film adhered thereto.

BRIEF DESCRIPTION OF THE DRAWINGS

Further features and other objects and advantages of this invention will become clear from the following detailed description made with reference to the drawings in which:

FIG. 1 is an end view of a stabilizer bar bushing in accordance with the present invention;

FIG. 2 is a side view of the stabilizer bar bushing of FIG. 1;

FIG. 3 is a partial cross-sectional view of the stabilizer bar bushing mount of FIG. 5 in which the stabilize bar bushing is secured by a metal retainer clip;

FIG. 4 is a cross-sectional view of a stabilizer bar bushing mount in which the stabilizer bar is secured in a metal retainer clip;

DESCRIPTION OF THE PREFERRED EMBODIMENTS

Figure 5:
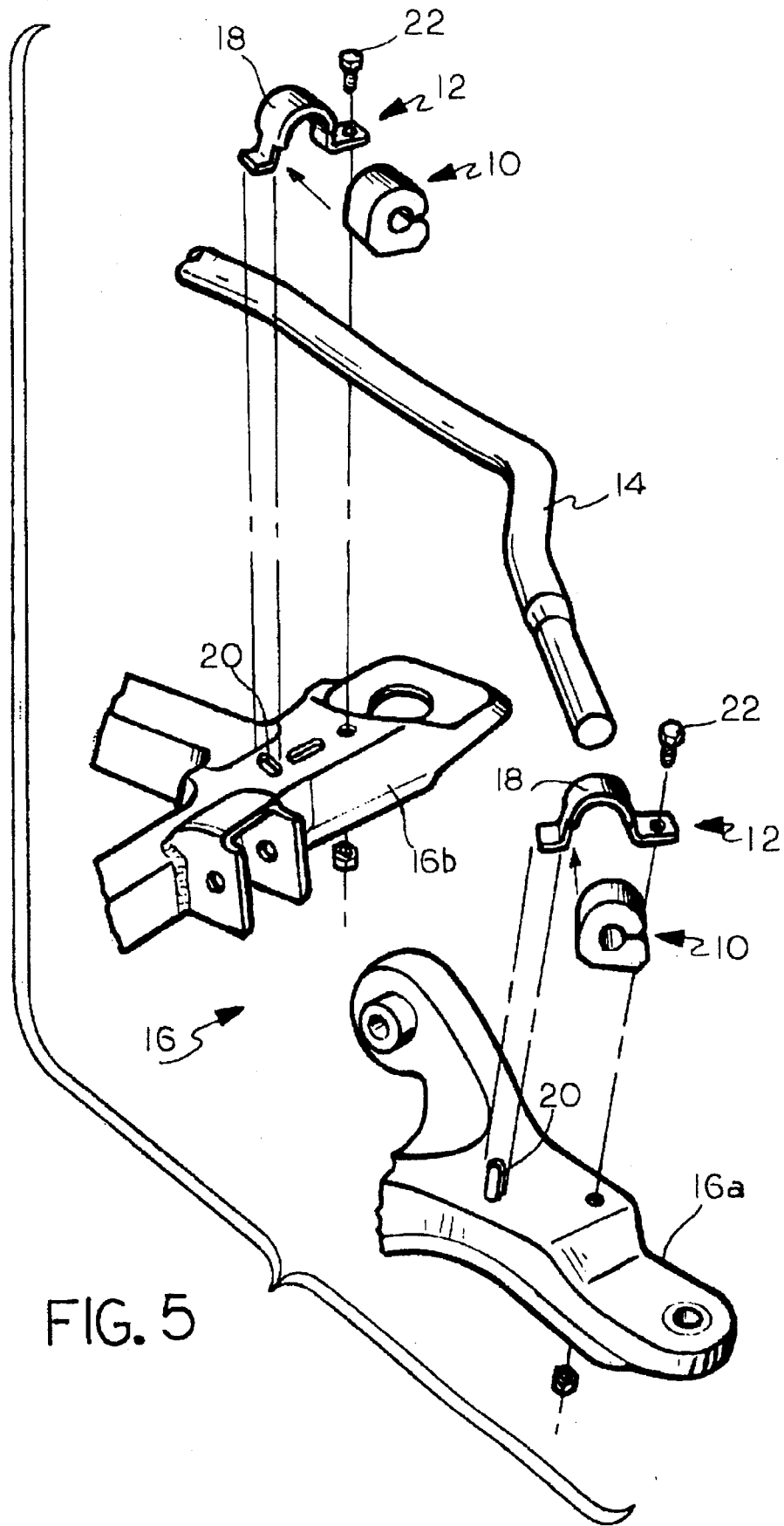
FIG. 5 is an exploded perspective view of a front suspension employing a stabilizer bar bushing in accordance with the present invention.
Figure 6:
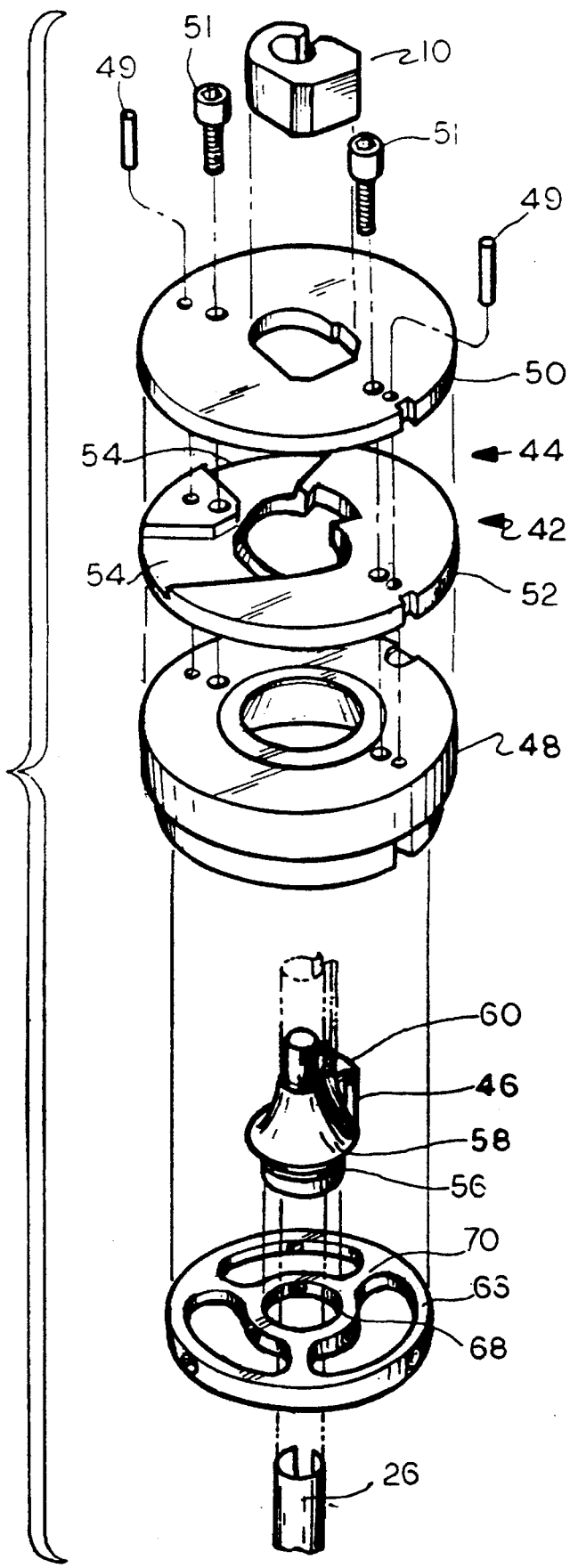
FIG. 6 is an exploded view of the die assembly for manufacturing the stabilizer bar bushing.

Referring to the drawings wherein like reference characters represent like elements, FIGS. 1–5 illustrate a stabilizer bar bushing 10 and a mounting assembly 12 for the stabilizer bar bushing for mounting a stabilizer bar 14 to the frame 16, e.g., front lower control assembly 16a and front assembly 16b, of a motor vehicle.

As well known in the art, the stabilizer bar bushing 10 is held in position on the vehicle frame 16 by a mounting assembly 12 including a U-shaped metal retaining bracket 18. One end of the retaining bracket is inserted in a correspondingly configured slot 20 within the vehicle frame 16 and the remaining end is then fastened to the vehicle frame with a threaded fastener 22 such that both ends are secured to the frame. As the metal bracket 18 is tightened against the frame 16 the bushing 10 collapses tightly around the stabilizer bar 14 located therein.

As shown in FIGS. 1–4, the stabilizer bar bushing 10 generally includes an elastomeric member 24 and a low coefficient of friction film layer 26.

The elastomeric member 24 of the stabilizer bar bushing 10 has an outer diameter 28, an inner diameter 30 and a slot 32. The inner diameter 30 defines a bore for receiving the stabilizer bar 14. The bore of the inner diameter 30 and the slot 32 extend the longitudinal length of the elastomeric member 24 from the outer diameter 28 to the inner diameter 30. The shape of the outer diameter 28 of the elastomeric member 24 is generally C-shaped in cross section with a plurality of surfaces including a planar base 34 and an arcuate top 36 and linear sides 38 connecting the base and top. The slot 32 is formed in the outer diameter 28 and is generally frusto-conical in cross section having outer chamfer surfaces 40. The slot 32 is typically formed in a surface of the outer diameter 28 which experiences the least anticipated force and therefore may be formed in a side 38, arcuate top 36 or planar base 34. The surfaces of the frusto-conical slot 32 provide tapered surfaces to guide the stabilizer bar 14 within the bore and are spaced apart sufficiently to facilitate easy insertion of the stabilizer bar without requiring that the slot be pried apart. In accordance with the present invention, it will be appreciated that the stabilizer bar 14 may be inserted within the slot 32 merely by pushing the cylindrical sides of the stabilizer bar 14 against the preformed tapered surfaces and outer chamfer 40 thereby facilitating insertion of the stabilizer bar without the requirement of additional force in separating the surfaces to pry the bushing open to provide access to the slot of the bushing 10. After insertion of the stabilizer bar 14 within the bushing 10 the elastomeric member 24 may then be placed into the metal bracket 18 and fastened to the vehicle frame such that the C-shaped elastomeric member closes down and around the stabilizer bar 14. This mounting arrangement allows the stabilizer bar 14 to be secured in such a manner that the stabilizer bar is rotatable about its longitudinal axis within the stabilizer bar bushing 10.

The elastomeric member 24 is formed of a suitable elastomeric material such as a non-polar rubber compound having a hardness compatible with specific dynamic requirements of the vehicle suspension so that the bushing is compatible with the remainder of the suspension system. In a preferred embodiment, the elastomeric member 24 may be formed of natural rubber, ethylene propylene diene monomer elastomer, butyl rubber and the like.

The low coefficient of friction film layer 26 is adhered to the surface of the bore of the elastomeric member 24 and to the tapered surface of the slot 32 of the elastomeric member. The film layer 26 extends from the upper edge of the chamfer 40 of the slot continuously to the lower edge of the slot 32 for the full width of the bushing 10 and around the circumference of the bore. The film layer 26 is a low friction, highly abrasion resistant material, preferably a thin film of ultra high molecular weight polyethylene. In a preferred embodiment, the film layer has a coefficient of friction of less than 0.20, and preferably approximately 0.15. The film layer 26 forms a slip layer at the interface between the metal stabilizer bar 14 and the elastomeric member 24. A suitable thin film layer 26 of ultra high molecular weight polyethylene is obtainable under the name Soluflex from UC Plastics of the Netherlands. The Soluflex film is formed by the geltrusion process which involves drawing a gel containing ultra high molecular weight polyethylene and a solvent through a die and removing the solvent. A suitable ultra high molecular weight polyethylene film may also be obtained by skiving of round stock molded from an ultra high molecular weight polyethylene powder as well known in the art. The film layer 26 acts to facilitate ease of insertion of the stabilizer bar 14 within the bore, reduce frictional engagement of the elastomeric member 24 with the stabilizer bar and prolong the useful life of the stabilizer bar bushing 10.

Figure 7:
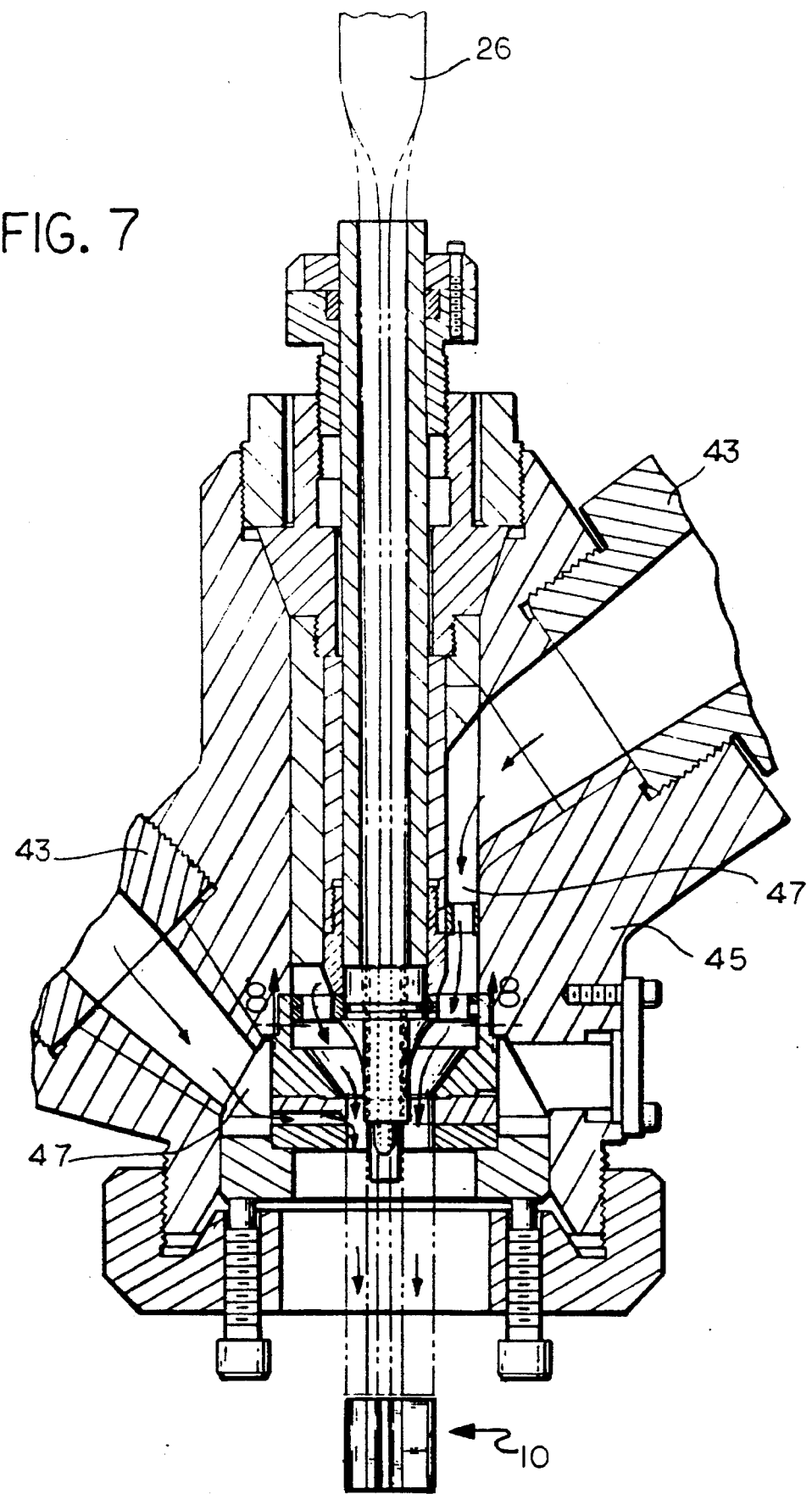
FIG. 7 is a schematic view of a die assembly and two extruders of a type well known in the art for manufacturing the stabilizer bar bushing.
Figure 8:
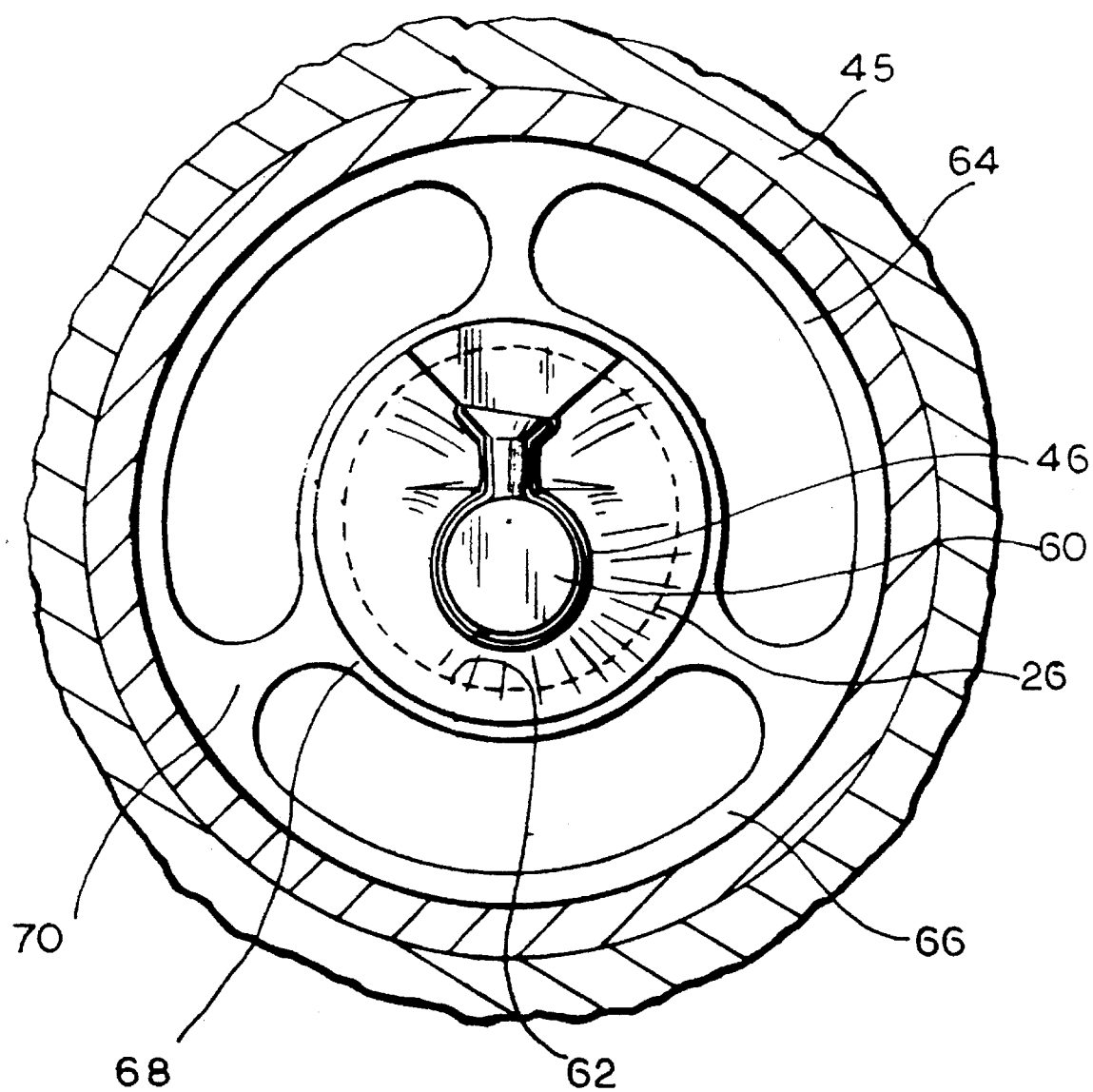
FIG. 8 is an end view of the film guide holder of the die assembly taken along line 8—8 of FIG. 7.
Figure 9:
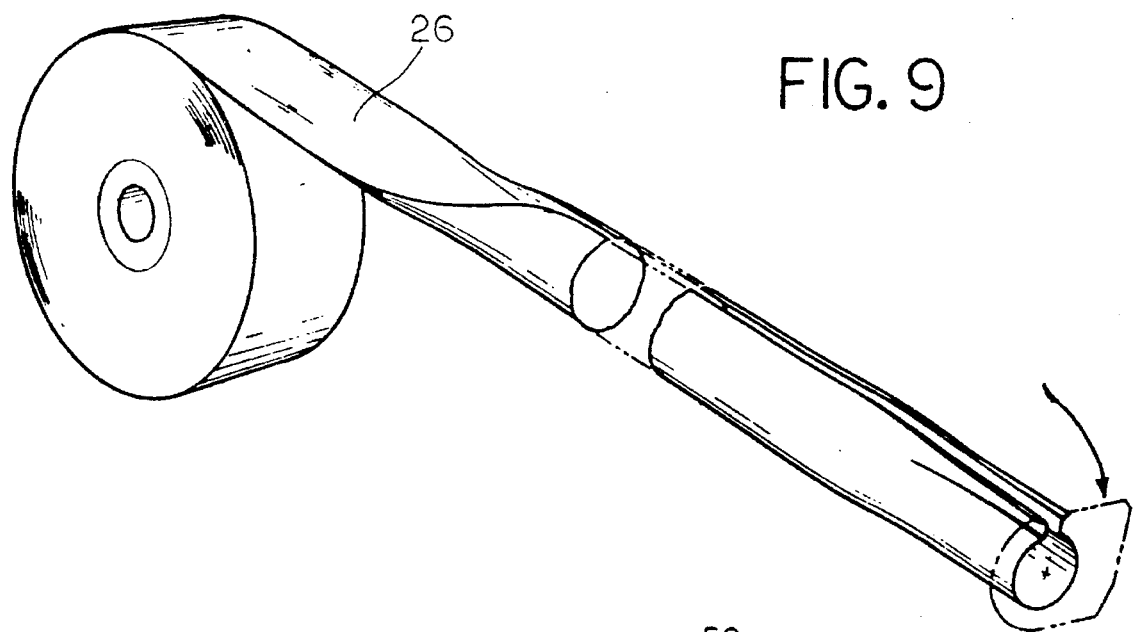
FIG. 9 is a perspective view illustrating the shaping of the thin film.
Figure 10:
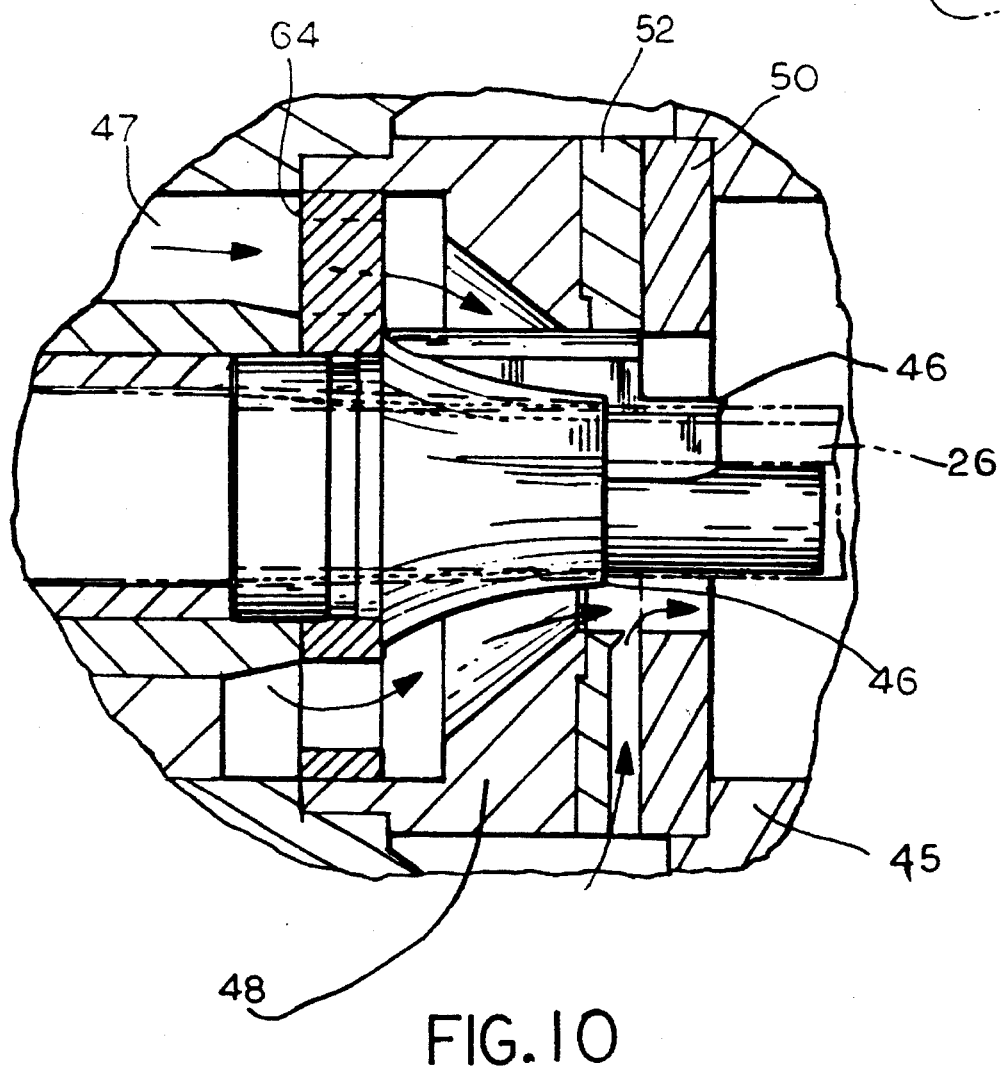
FIG. 10 is an enlarged partial schematic side view of the die assembly and two extruders of FIG. 7.

The stabilizer bar bushing 10 in accordance with the present invention is formed by a cross-head extrusion process in which the thin film layer 26 passes generally transverse to the direction of flow of the elastomeric material as the elastomeric material enters the die assembly 42. Referring to FIGS. 6–10, the elastomeric material is conveyed from a feed hopper of one or more extruders 43 of a conventional design continuously along a screw of the extruder through regions of high temperature and pressure where the elastomeric material is melted and compacted and finally forced through the die assembly 42. The general flow of the elastomeric material from the extruders 43 and through the die assembly 42 is indicated by arrows in FIGS. 7 and 10. The extruders 43 are operatively connected as well known in the art to a housing 45 containing the die assembly 42 to feed elastomeric material to the die assembly through channels 47 within the housing. It will be appreciated that FIGS. 7 and 10 are a schematic depiction of extruders 43 and a housing 45 suitable for carrying out the process of this invention. In considering the structure shown in FIGS. 7 and 10 it must be realized that the structure is schematic only and that certain details of construction are not provided for purposes of clarity. It will also be understood that these construction details are, once the invention is disclosed and explained, well within the skill of the art.

The die assembly 42 includes a die 44 having a cavity of a shape of an outer profile of the stabilizer bar bushing 10 and a film guide 46 having an outer profile of the shape of the bore of the stabilizer bar bushing.

The elastomeric material 24 is directed from the extruder(s) toward the center of the die 44 by a die funnel 48. The die funnel 48 facilitates complete filling of the die cavity. The cavity of the die 44 is formed from two or more die plates 50 and 52 of a suitable size and shape such that, when combined, the die plates form the outer profile of the elastomeric bushing 10. The die plates 50 and 52 and die funnel 48 are aligned by pins 49 within appropriately configured holes and secured together through threaded fasteners 51. An entry means 54 may be formed between die plate 52 and die plate 50 to allow elastomeric material 24 from an extruder into the die cavity and supplement the elastomeric material introduced from the other extruder(s).

As elastomeric material 24 is conveyed from the extruder, around the film guide 46 and through the die funnel 48 to the die cavity a thin film of the low coefficient of friction material 26 passes through the film guide 46 into the die 44 and into intimate contact with the melted elastomeric material within the die assembly 42 such that an adhesive bond is formed between the elastomeric material and the thin film.

The film guide 46 of the die assembly 42 includes a cylindrical base 56 and a concave frusto-conical intermediate portion 58 which tapers to a top portion 60 having a shape and size matching the interior profile of the stabilizer bar bushing 10. The cylindrical base 56 includes a slot 62 formed around the circumference thereof and extending to the top of the frusto-conical portion 58 to receive and shape the thin film 26. The thin film 26 is continually paid out from a roll as a flat sheet and pass through the slot 62 where the flat sheet is curled to form a generally cylindrical tube having a shape matching the shape of the interior of the film slipper bushing 10.

The film guide 46 is maintained in position within the die funnel 48 by a guide holder 64. The guide holder 64 includes an outer ring 66 and a concentric inner ring 68 interconnected by cross members 70. The cylindrical base 56 of the film guide 46 is inserted within the inner ring diameter 68. Elastomeric material flows from the extruder, freely around the cross members 70 between the outer ring 66 and the inner ring 68 of the guide holder 64 and around the film guide 46 and through the die funnel 48.

It will be appreciated that the elastomeric material and low friction film layer 26 adhere to one another by using cross-head extrusion without chemical or physical pretreatment of the low friction film. The formed length of rubber bushing 10 from the die 44 is then continuously cured or vulcanized as well known in the art. For example, the formed length of rubber bushing may be cured or vulcanized in a liquid medium such as a salt bath, by hot air in a hot air oven, microwave, or a fluidized bed at temperatures between 360 degrees Fahrenheit and 460 degrees Fahrenheit for between about 2 to 6 minutes. After the formed length of rubber bushing is cured or vulcanized, the formed rubber bushing is cut to a desired length to form an individual length 10.

It has been found that a stabilizer bar bushing 10 in accordance with the present invention may be used in a mounting assembly that is nonsqueak through a temperature range of approximately 100 degrees Fahrenheit to approximately −30 degrees Fahrenheit.

The invention will be further clarified by a consideration of the following example, which is intended to be purely exemplary of the invention.

EXAMPLE

Two 3 ½ inch barrel diameter extruders, model Davis-Standard 35IN35, were operatively connected as known in the art, one to the die funnel and the other to the die. One extruder was running at 50 rpm and the other extruder was running at 53 rpm. The temperature of the screw of both extruders was set at about 130 degrees Fahrenheit. The temperature of the barrel and head was set at about 140 degrees Fahrenheit. The conveyor line speed was set at approximately 20 feet per minute. Elastomeric material was picked up from a feed hopper and propelled continuously along the screw through regions of high temperature and pressure where the elastomeric material was melted and compacted. The melted and compacted elastomeric material was then forced into the die funnel and the die cavity as previously described. Simultaneously a thin film of ultra high molecular polyethylene known as Soluflex from UC Plastics of the Netherlands was passed through a film guide into the die at a rate of 20 feet per minute such that the elastomeric material adhered to the thin film of ultra high molecular weight polyethylene. The extruded stabilizer bar bushing was then cured in a hot air oven at about 460 degrees Fahrenheit and then sliced into lengths of about 1.25 inches.

The stabilizer bar bushing fatigue life was then tested by rotating the bushing around a metal bar through an angle of rotation of ±15 degrees, for approximately 159,000 cycles under no load and, then an additional 3,115,000 cycles under a 45 lb. preload. The film surface of the stabilizer bar bushing showed only slight wear after completion of the fatigue test. As shown by the foregoing example, the stabilizer bar bushing in accordance with the present invention exhibited superior wear and abrasion resistance properties.

Moreover, it will be appreciated that although the foregoing example and figures illustrate the use of two extruders to manufacture the stabilizer bar bushing in accordance with the invention any number of extruders of a suitable size may be used. For instance, in the foregoing Example, a single extruder having a 6 inch diameter barrel may also be used and perform equally as well.

The patents referred to herein are hereby incorporated by reference.

Having described presently preferred embodiments of the invention, it is to be understood that it may be otherwise embodied within the scope of the appended claims.

What is claimed is:

1. A stabilizer bar bushing adapted to receive a metal stabilizer bar and to be secured within a mounting assembly that is attached to a vehicle frame for cooperatively resisting excessive sway when a vehicle is turning, the stabilizer bar bushing comprising:

a) an elastomeric bushing member, said elastomeric member having an outer surface, an inner diameter defining a bore and a slot having a frusto-conical cross section extending the longitudinal length of said elastomeric member from said outer surface to said inner diameter; and b) a solid abrasion resistant low coefficient of friction film layer of ultra high molecular weight polyethylene adhered to said bore and said slot to facilitate ease of insertion and removal of said stabilizer bar from within said bore and reduce frictional engagement of said elastomeric member with the stabilizer bar.

2. The stabilizer bar bushing of claim 1 wherein said film layer and the stabilizer bar has a coefficient of friction of less than 0.20.

3. The stabilizer bar bushing of claim 2 wherein said film layer is a thin film of ultra high molecular weight polyethylene having a weight average molecular weight between 3,000,000 and 6,000,000.

4. The stabilizer bar bushing of claim 3 wherein said film layer is about 3 micrometer to 400 micrometer thick.

5. The stabilizer bar bushing of claim 4 wherein said film layer is a thin film of ultra high molecular weight polyethylene prepared by geltrusion.

6. The stabilizer bar bushing of claim 3 wherein said elastomeric member is a non-polar rubber compound.

7. The stabilizer bar bushing of claim 6 wherein said elastomeric member is formed of ethylene propylene diene monomer elastomer.

8. The stabilizer bar bushing of claim 3 wherein said slot has outer chamfer surfaces to facilitate insertion of the stabilizer bar.

9. The stabilizer bar bushing of claim 8 wherein said outer diameter is generally C-shaped in cross section with a plurality of surfaces including a planar base, an arcuate top and linear sides connecting said base and said top, said slot formed in one of said surfaces.

* * * * *